(12) United States Patent
Sarwari

(10) Patent No.: US 7,187,049 B2
(45) Date of Patent: Mar. 6, 2007

(54) DATA DOWNLOAD TO IMAGER CHIP USING IMAGE SENSOR AS A RECEPTOR

(75) Inventor: Atif Sarwari, Saratoga, CA (US)

(73) Assignee: Micron Technology, Inc., Boise, ID (US)

( * ) Notice: Subject to any disclaimer, the term of this patent is extended or adjusted under 35 U.S.C. 154(b) by 459 days.

(21) Appl. No.: 10/143,578

(22) Filed: May 13, 2002

(65) Prior Publication Data

US 2003/0210439 A1    Nov. 13, 2003

(51) Int. Cl.
*H01L 31/00* (2006.01)
(52) U.S. Cl. .................. 257/431; 348/65; 398/115; 600/160; 257/E31.001
(58) Field of Classification Search ........ 708/100–112; 257/431, E31.001; 348/65–76; 398/115–117; 600/109–112, 118, 160–182
See application file for complete search history.

(56) References Cited

U.S. PATENT DOCUMENTS

| | | | | |
|---|---|---|---|---|
| 4,056,805 A | * | 11/1977 | Brady | ................. 84/464 R |
| 5,334,855 A | * | 8/1994 | Moyer et al. | ................. 257/13 |
| 5,535,147 A | * | 7/1996 | Jacobs et al. | ............... 708/111 |
| 5,570,297 A | | 10/1996 | Brzezinski et al. | |
| 5,604,531 A | | 2/1997 | Iddan et al. | |
| 5,652,602 A | | 7/1997 | Fishman et al. | |
| 5,922,058 A | * | 7/1999 | Fishman et al. | ............... 710/72 |
| 5,929,840 A | * | 7/1999 | Brewer et al. | ............... 715/862 |
| 5,986,623 A | | 11/1999 | Chiloyan et al. | |
| 6,147,366 A | | 11/2000 | Drottar et al. | |
| 6,169,318 B1 | | 1/2001 | McGrath | |
| 6,204,524 B1 | * | 3/2001 | Rhodes | ................. 257/222 |
| 6,326,230 B1 | | 12/2001 | Pain et al. | |
| 6,333,205 B1 | | 12/2001 | Rhodes | |
| 6,350,981 B1 | | 2/2002 | Uno | |
| 6,376,868 B1 | | 4/2002 | Rhodes | |
| 6,492,636 B1 | * | 12/2002 | Chen et al. | ............ 250/227.14 |
| 2002/0160711 A1 | * | 10/2002 | Carlson et al. | ................. 455/41 |
| 2003/0073935 A1 | * | 4/2003 | Segawa et al. | ............. 600/593 |
| 2004/0021101 A1 | * | 2/2004 | Livingston | ................. 250/588 |

OTHER PUBLICATIONS

Bell Labs Licenses "Camera on a Chip" Technology (accessed May 8, 2002) <http://www.bell-labs.com/news/1998>.
Complete Color Video Camera on a Single CMOS Chip (accessed May 8, 2002) <http://wwwmars-cam.com/cmos-c.html>.

(Continued)

*Primary Examiner*—Marcos D. Pizarro
(74) *Attorney, Agent, or Firm*—Dickstein Shapiro LLP

(57) ABSTRACT

An imaging device having a CMOS photosensor array for capturing images is described in which the array is also used to input programming and/or data used to control the imaging operations. The data-input can be based upon variations in light color, value, intensity, and patterning, or any combinations of the foregoing, for the download of information to the device.

34 Claims, 10 Drawing Sheets

OTHER PUBLICATIONS

Hitachi Releases Industry's Smallest High-Picture-Quality CMOS Sensor Camera Module for Portable Devices (accessed May 9, 2002) <http://global.hitachi.com/New/cnews/E/2002/2018/index.html>.

Photon Vision Systems: New QuadHDTV™ Video Image Sensor (accessed May 9, 2002) <http://www.photon-vision.com/>.

Canon EOS D30 Digital SLR (accessed May 7, 2002) <http://www.imaging-resource.com/PRODS/D30/D30A4.HTM>.

Camera on a chip (accessed May 7, 2002) <http://salon.com/tech/view/2000/05/22/kemeny/index1.html>.

Mark Compton: "Camera on a Chip" (accessed May 7, 2002) <http://www.salon.com/tech/view/2000/05/22/kemeny/>.

Camera on a Chip (accessed May 7, 2002) <http://www.jpl.nasa.gov/technology/images_videos/iv_pages/camera_on_a_chip.html>.

Dawn Levy: Speedy Camera-on-a-Chip both captures and processes images;<http://www-isl.stanford.edu/-abbas/group/stanford_report/digicam426.html>.

Timex (accessed May 7, 2002) <http://www.timex.com/bin/detail,tmx?item=048148697218>.

Internet Messenger (accessed May 7, 2002) <http://www.timex.com/html/data_link.html>.

* cited by examiner

DATA DOWNLOAD TO IMAGER CHIP USING IMAGE SENSOR AS A RECEPTOR

FIELD OF THE INVENTION

The invention relates to methods and devices for rapidly transferring information as light impulses. More particularly, the invention relates to use of a CMOS photosensor array of an imager system for the download of data as image-based information streams for programming a device used to control operation of the imaging system.

BACKGROUND

Technology for the transmission of information as light impulses has existed for many years. For instance, modern remote control devices for televisions and video cassette recorders operate on this principle, as does the common personal digital assistant capable of receiving data-input. Usually this data-input has been in the form of infrared light. Laser light is also often used in wireless transmission systems.

Most recently, watches have been developed to receive data-input (as bar codes or the like) from a computer monitor as informational instructions for output of data to a wearer. Digital cameras have become popular in recent years. Such cameras can capture images or streams of images and utilize either a charge couple device (CCD) or increasingly with a complementary metal oxide semiconductor active pixel sensor (CMOS APS) to do so. CCD sensors rely on specialized fabrication that requires dedicated and costly manufacturing processes. In contrast, CMOS image sensors can be made at standard manufacturing facilities that produce standard semiconductor chips. The fabrication and basic operation of CMOS imaging systems is well documented, for instance in U.S. Pat. Nos. 6,376,868 and 6,333,205, the entirety of each is hereby incorporated by reference.

As the complexity and variety of operations performed by CMOS imaging systems increase, the control of the imaging operation becomes more complex, increasing the desire for imaging system programmability. The need for flexibility in different environmental uses requires a certain amount of programmability in functional operations. In some environments of use, where, for example, the CMOS imager may be constructed as a sealed pill device, external programming of the imaging system is difficult.

SUMMARY

This invention relates to an imaging system having a CMOS photosensor array capable of receiving image data and in which the photosensor array is also usable to acquire programming data for the imager system. The program data can be input to the photosensor array as variations in light color, value, intensity, and patterning, or any combinations of the foregoing, for the download of program and other information to the imager system incorporating the photosensor array. A memory circuit in communication with the photosensor array can load and store the program and other information received by the photosensor array. The memory circuit contents can then be utilized by an imaging system controller to control the device once the photosensor array begins acquiring images. These and other features and advantages of the invention will be more clearly understood from the following detailed description of the invention, which is provided in connection with the accompanying drawings.

DETAILED DESCRIPTION

This invention relates to a device having a CMOS photosensor array capable of receiving programming and/or operating data-input from an external optical link. The data-input can be input as variations in light color, value, intensity, and patterning, or any combinations of the foregoing, for the download of information to the device incorporating the photosensor array. Such a system allows more rapid download of information to the device than is available with prior art techniques. The information can, for example, be microcode, hardware interrupt control instructions, software (e.g., debugging software), revised program software, or operating parameters. A memory circuit in communication with the photosensor array can load and store the programming and/or operating data received by the photosensor array. A controller can utilize the programming and/or operating data stored by the memory circuit to control image capturing by the imaging device once the photosensor array begins acquiring images.

In the following detailed description, reference is made to various embodiments in which the invention may be practiced. These embodiments are described with sufficient detail to enable those skilled in the art to practice the invention, and it is to be understood that other embodiments may be employed, and that structural and electrical changes may be made without departing from the spirit or scope of the present invention.

Figure 1:
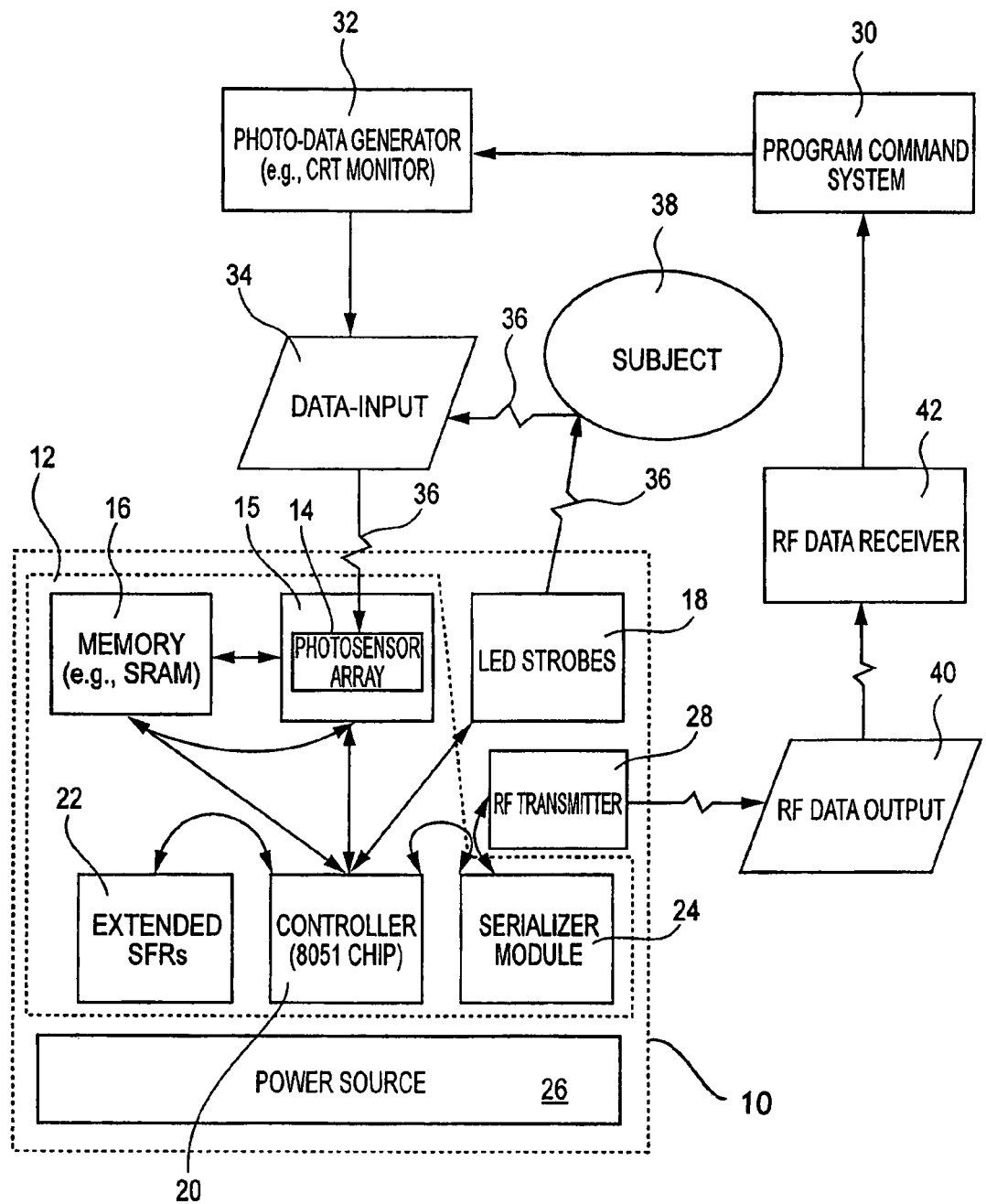
FIG. 1 is block diagram showing components of an embodiment in accordance with the invention.

Now referring to the figures, where like reference numbers denote like features, FIG. 1 shows a basic architecture of a system incorporating a device 10 in accordance with the invention. The system has, at its core, a device 10 that can incorporate, at least, an imager chip 12. The imager chip 12 can have a photosensor array 14, a photosensor interface 15, a memory circuit 16, and a controller 20 integrated on the same silicon chip, which can add versatility in terms of configuration features. The photosensor array 14 is preferably a CMOS photosensor (similar to those described above in the Background section). The photosensor array 14 can have a 256×256 pixel array, a 352×288 (CIF) array, or any other single array. The photosensor array 14 comprises pixels 200 (shown in detail later in reference to FIG. 5) that can be any of size, but are preferably about 10 μm×10 μm in size. The light intensity range for the pixels 200, again can be within any range known in the art, but is preferably about 1 lux/μm to about 15 lux/μm. The pixels 200 of the photosensor array 14 can be capable of 8-bit data output (serial;

shifted out). The photosensor interface 15 can be controlled by the controller 20 for addressing the photosensor array 14.

Figure 2:
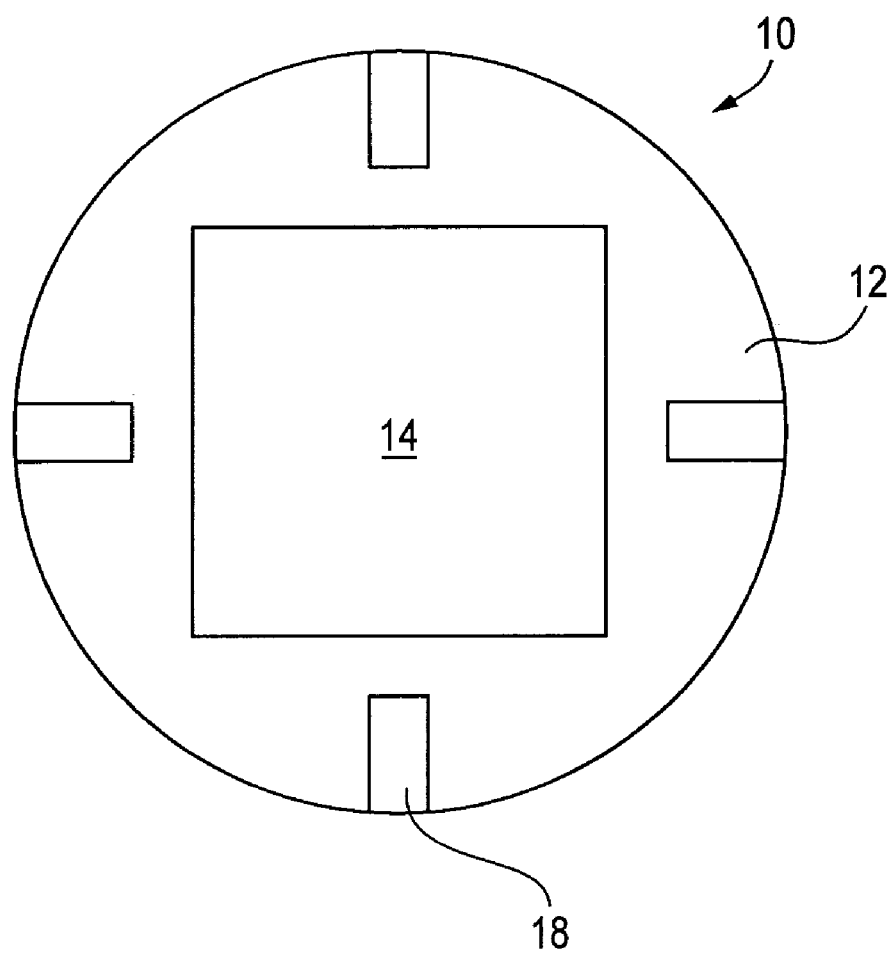
FIG. 2 is a front view of a device in accordance with the invention.

A Bayer filter 202 (discussed in greater detail below in reference to FIG. 5) can be incorporated into the photosensor array 14 for color discernment; however, other color filtering and discernment means known in the art can be used as well. FIG. 2 shows an embodiment of the device 10 from the top, showing the imager chip 12 with the photosensor array 14 and LED strobes 18 around the array.

As noted, memory circuitry 16 can be integrated on the same chip as the photosensor array 14 and controller 20. It is possible to integrate the memory circuit 16, photosensor array 14, extended SFRs 22, serializer module 24 and controller on the same integrated circuit die as described in copending U.S. Pat. application Ser. No. 10/143,093, entitled INTEGRATED MICROCONTROLLER AND IMAGE-SENSOR, by the same inventor herein, filed on May 13, 2002, the disclosure of which is incorporated herein by reference. The manner in which the device 10 operates during image acquisition is described in the above-referenced copending application.

The memory circuit 16 can incorporate any memory circuit devices known in the art, but preferably uses an integrated SRAM memory. As is shown in FIG. 1, the memory circuit can communicate with the other operational circuits of the device 10, including, but not limited to, a controller 20 (e.g., an 8051 controller), a serializer module 24, extended shift registers SFRs 22 (which can be allocated to pre-defined functions or user-definable functions), and an RF (radio frequency) transmitter 28. The memory circuit 16 is capable of storing operational information for the photosensor array 14 and all other circuitry incorporated into the device 10. Further, the memory circuit 16 is be capable of storing images received by the photosensor array 14, be they snapshot images, streaming video, or the downloaded programming and/or data-information. The controller 20 operates as the "brain" of the device 10 using programming and/or data stored in the memory circuit 16, and/or in an internal ROM. The controller circuit 20 can utilize the stored programs and/or data in controlling the acquiring of images, the storing of images, and the communication of images to an external system for viewing.

The CMOS photosensor array 14 can download captured images, like a camera. However, the CMOS photosensor array 14 of the invention can also download programming and/or operational information as data-input 34, such as software, programming, or other useful data. FIG. 1 shows the system for providing the device 10 with a download in this manner. A user can select the data desired to be downloaded by utilizing a program command system 30, which can contain a collection of programs, instructions, software, or other data that can be utilized by the device 10. The program command system 30, which can be a standard computer, communicates to a photo-data generator 32, which can be any device capable of outputting light signals, for instance, a computer monitor (CRT) connected to a computer, or an LED unit. Preferably, the photo-data generator 32 can output light at various wavelengths (colors) and intensities, and in various patterns.

The photo-data generator 32 generates light 36, which is input to photosensor array 14 during a period when it is not acquiring images. This period can be controlled and designated by the controller 20. The light 36 can be varied in any means known in the art so that it corresponds to the data desired to be downloaded into the device 10. As an example, the light can be varied in color, where different colors or color patterns can be read by the photosensor array 14, stored in the memory circuit 16, and interpreted by the controller 20 of the device 10, via communication with the photosensor array 14, as different digital information (i.e., "1s" and "0s"). In this way, the memory circuit 14, and device 10 in general, can be programmed by a user with the input of light 36 to the photosensor array 14.

The time period for the downloading of information to the device 10 in the above-described manner can be limited and controlled by the controller 20 so that the same photosensor array 14 can subsequently be used as an image input device. This can be accomplished in a variety of ways. One such way is to have an established period of time after the device 10 is initially turned on that is dedicated to using the photosensor array 14 as program and/or data downloading system. During this time period, about 20 seconds for example, the user can position the device 10 so that the photosensor array 14 faces the photo-data generator 32 so that the photosensor array 14 can optically "see" any light emitted by the photo-data generator 32. A stream of programming code can be emitted from the photo-data generator 32 to the photosensor array 14. At the end of the exemplary 20 second period, the photo-data download terminates. The device's 10 LED(s) 18, which are normally strobed to illuminate an imaging subject 38, can be controlled by the controller 20 during the program and/or data download period to signal the user by flashing to indicate whether or not the download was satisfactory.

After the initial download period, the device 10 is ready to function as an imager camera (e.g., which may utilize the just-downloaded information). The camera function of the device 10 is like that of any other CMOS imager camera to acquire still frames or constant motion video. If necessary, the LED(s) 18 can function as light strobes during camera use, and be synchronized with the image acquisition by the photosensor array 14. Light 36 from the LED 18 can illuminate a subject 38 within an image area to be captured. The reflected light 36 from the illuminated subject 38 can be acquired by the photosensor array 14. The images acquired by the photosensor array 14 are communicated to and translated by the serializer module 24 into a format for image output.

The memory circuit 16 can store programming and/or data so that the controller 20 can use the input programs and/or data acquired during the data input operation to direct the operation of the photosensor array 14, the serializer module 24, and the extended SRFs 22 (all of which can be in communication with the memory circuit 16 and controller 20) for image capture, storage, processing, and output.

At a desired time, or on an ongoing basis, the stored images can be translated into an RF data output 40 generated by an RF transmitter 28 in communication with the serializer module 24 under control of the controller 20. The images, as RF data output 40, are transmitted to an RF data receiver 42. The RF generator works on a 430 MHz frequency. The RF data receiver 42 is in communication with the program command system 30 so that a user can receive the images acquired by the photosensor array 14 for viewing, for example on the same computer monitor (i.e., photo-data generator 32) that could be used to initially program the device 10.

Figure 3:
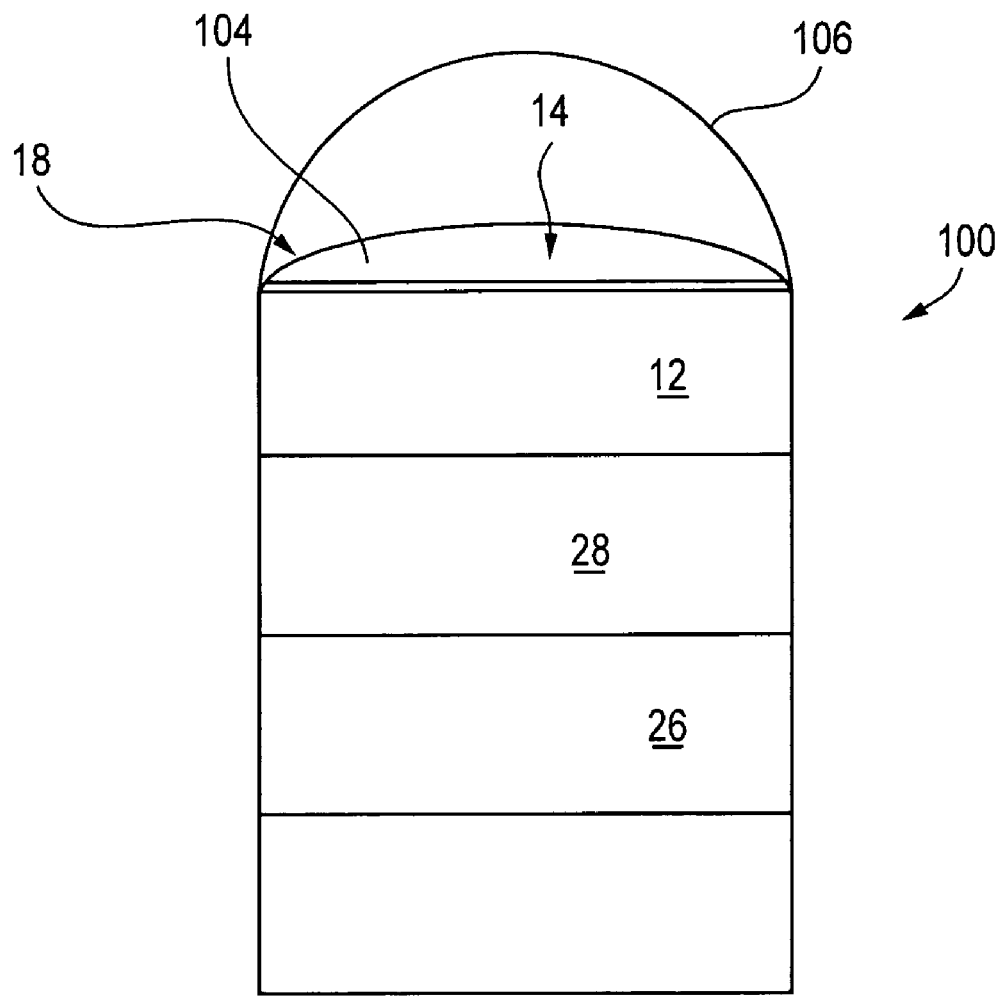
FIG. 3 shows an embodiment in accordance with the invention.

In a preferred embodiment, the device 10 is incorporated into a swallowable pill, as shown in FIG. 3. The pill device 100 can be used, for example, to acquire images of the internal systems (e.g., digestive tract) of an organism. The total size of the pill device is about 26 mm or less by about 12 mm or less, so that it may be swallowed by the organism. In this preferred embodiment, the imager chip 12, RF generator 28, and power source 26 (e.g., nickel-cadmium or silver-oxide battery), and other functional features of the device 10 are sealed within an inert barrier 106, such as a plastic capsule. The photosensor array 14, as well as the rest of the imager chip 12, are further protected from the external environment by a glass cover 104. The glass cover can be less than 0.5 mm thick and can have an infrared reject filter on the inner side of the glass. The glass cover 104 can also be used as lens if desired. For example, it may be desirable to utilize a wide-angle lens in the digestive tract of an animal. The pill device 100 has one input (the photosensor array 14) and two outputs (the LED 18 and the RF generator 28) for communication with external systems. The pill device 100 operates on a power source having about $2.8 \text{ v} \times 0.3 \times 10^{-3}$ W power.

Various programs and/or data are downloaded into the imaging device 10 in accordance with the invention. For example, if the imager device 10 is configured as a pill device 100, the image capture frequency and strobing sequence of the LED(s) 18 can be programmed. The synchronization of the image reading by the photosensor array 14 to the LED 18 is programmed. Image fill frame formatting is programmed. Further, lossless compression, scrambling, and cavity lighting requirements, among other things, are programmed into the device. Additional functions of the imager can be controlled by the downloaded information, as will become apparent to those of skill in the art.

Figure 4:
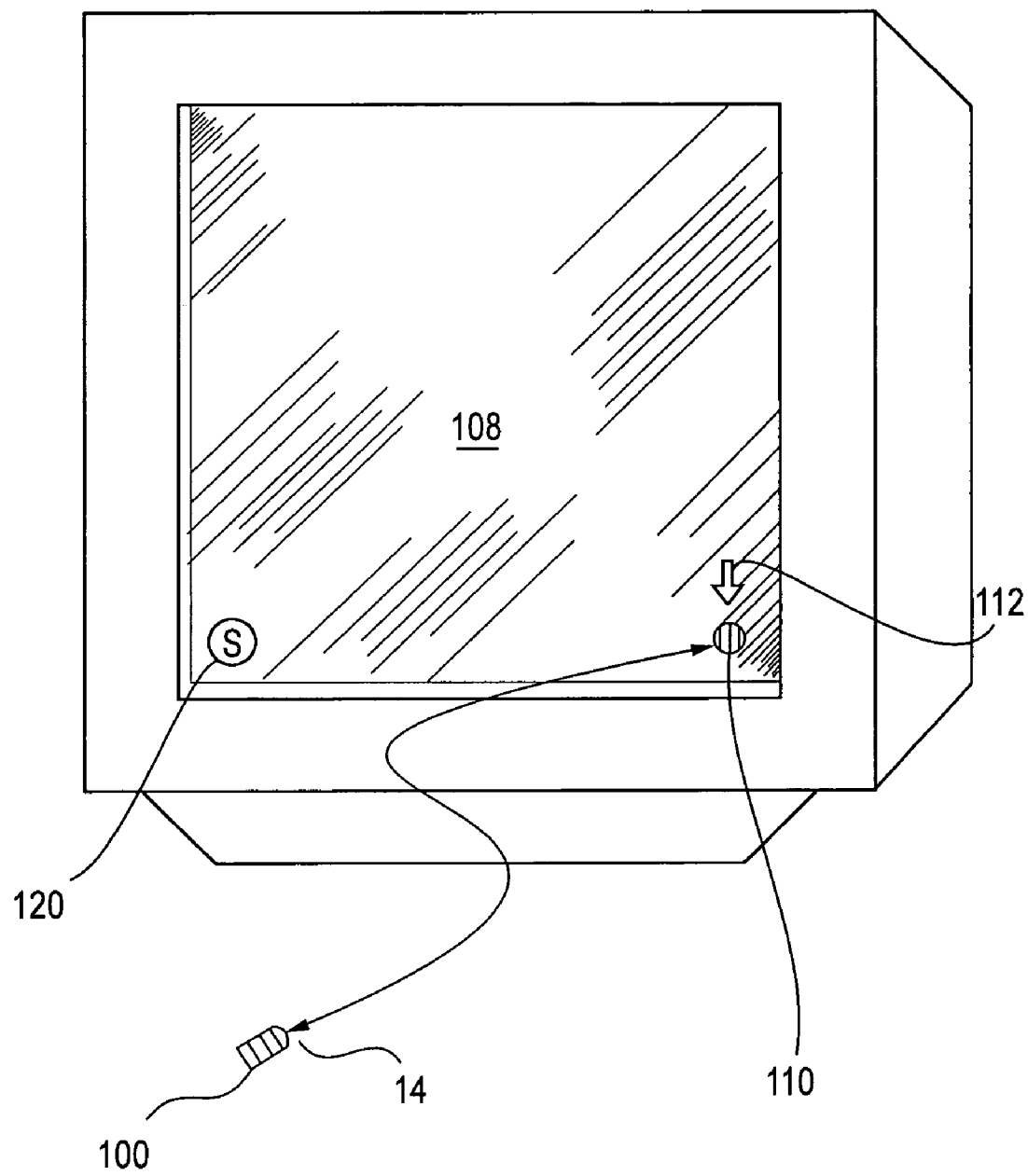
FIG. 4 illustrates an embodiment of the invention in which data-input is downloaded into a device via a computer monitor.

Just as there are many different embodiments for using the device of the invention, there are many embodiments for the procedure of downloading information into the device of the invention. One such method was described above, and as shown in FIG. 4, involves using a computer monitor 108 as a photo-data generator 32 (FIG. 1). An icon 120 can be provided so a user can initiate the download operation. FIG. 4 also shows a computer monitor 108 that has a small portion illuminated for output of data-input to the photosensor array 14, which for the purposes of illustration is shown as the pill device 100 discussed above. A user can be directed to align the photosensor array 14 of the pill device 100 with the photo-data portion 110 of the computer monitor 108 screen. A director arrow 112 can be displayed on the monitor 108 to show the user where to place the pill device 100 with the photosensor array 14 facing the monitor 108. Once the user has aligned the pill device 100 the program command system 30 can be directed to download the desired program and/or data information to the device 100. It is also possible to utilize the entire monitor 108 screen for outputting the data-input 34 to the photosensor array 14.

In one embodiment, data can be downloaded to the photosensor array 14 as color changes. The photosensor 14 can face the display monitor, as shown in FIG. 4. A software application can run on the program command system 30 (FIG. 1), which can communicate with the photo-data generator 32, here a computer monitor 108, to emit photo-data as light 36. In an exemplary embodiment the computer monitor 108 can display green to indicate the start of transfer of a binary steam of information. The display can transition to display red (here, indicating a digital value of "1") or to blue (here, indicating a digital value of "0"), thereby taking advantage of the color filter incorporated into the photosensor array 14. A red followed by a blue or a blue followed by a red can be used to indicate EOT (end-of-transfer). Table 1 below demonstrates the sequence of color flashes to convey the digital binary stream "00011011."

Figure 5:
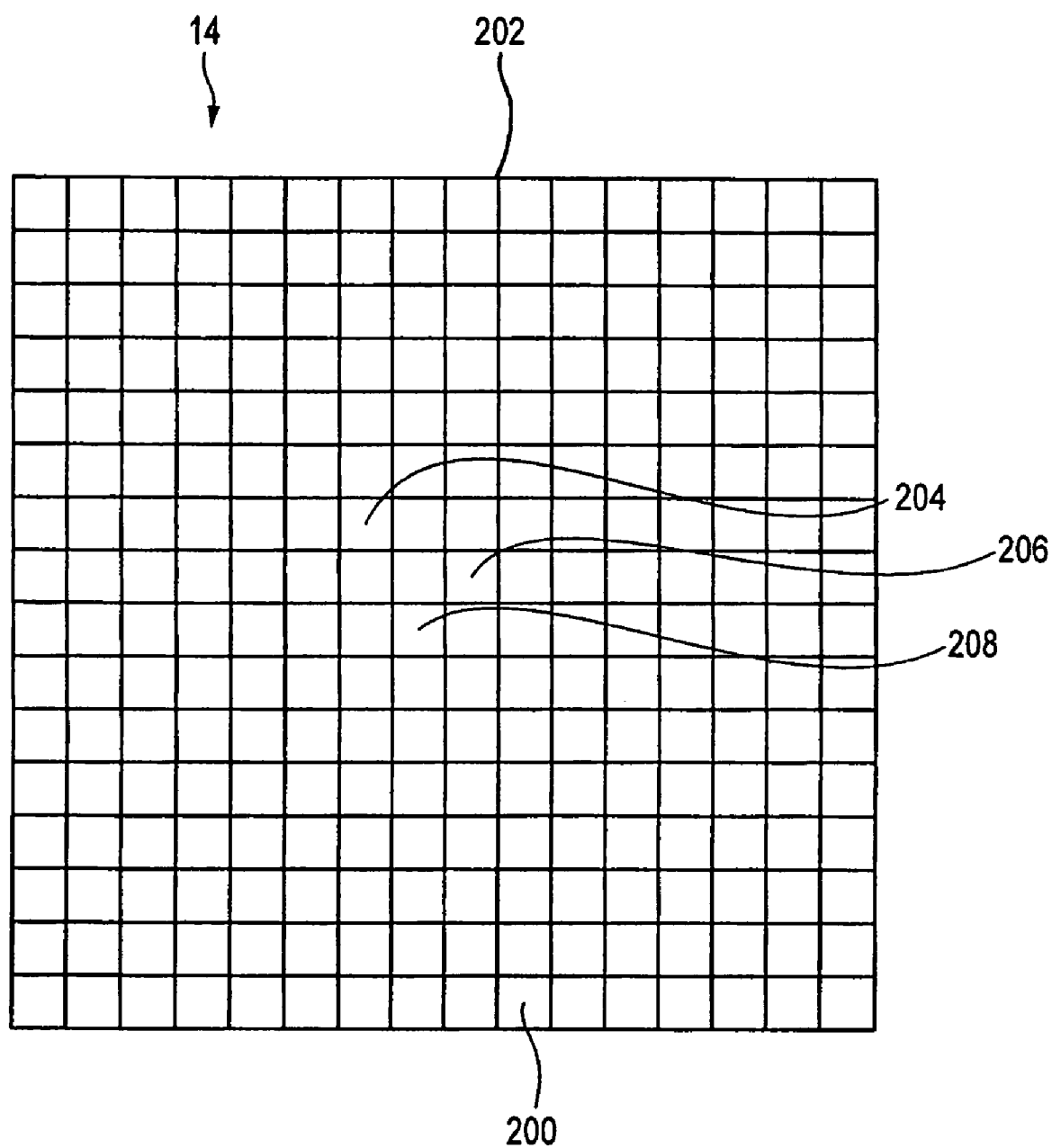
FIG. 5 shows a 16×16 Bayer filter CMOS sensor in accordance with the invention.

FIG. 5 shows three conveniently located pixels 200 (for instance around the center) on the photosensor array 14; one green 204, one blue 206, and one red 208. Each of these three selected pixels 204, 206, 208 is a different color. With an 8-bit digital resolution for each color a high-threshold of about 170 (implying a logical "1" if the intensity of color is between 170 and 255, inclusive) can be defined.

The entire computer monitor 108 screen can be used to transmit data-input to the photosensor array 14 without interference from ambient light (i.e., noise). The algorithm of FIG. 6 can be used to for the capturing of streaming content, such as that shown in Table 1. By using the three primary colors (green, blue and red) and three separate pixels 204, 206, 208 to sense the colors, the probability of error in transmission of the data-input 34 data is low because of a high noise margin. This high noise margin means that the transmission (whether using the entire computer monitor 108 screen or not) can be successful in either a room that is well lit with high ambient light or in a room that is dark. For added noise tolerance, the low-threshold value can be raised. If the entire computer monitor screen 108 is used, the device 10 need not be perfectly aligned with the monitor 108, but only facing in its direction with the photosensor array 14 optically exposed thereto.

Figure 6:
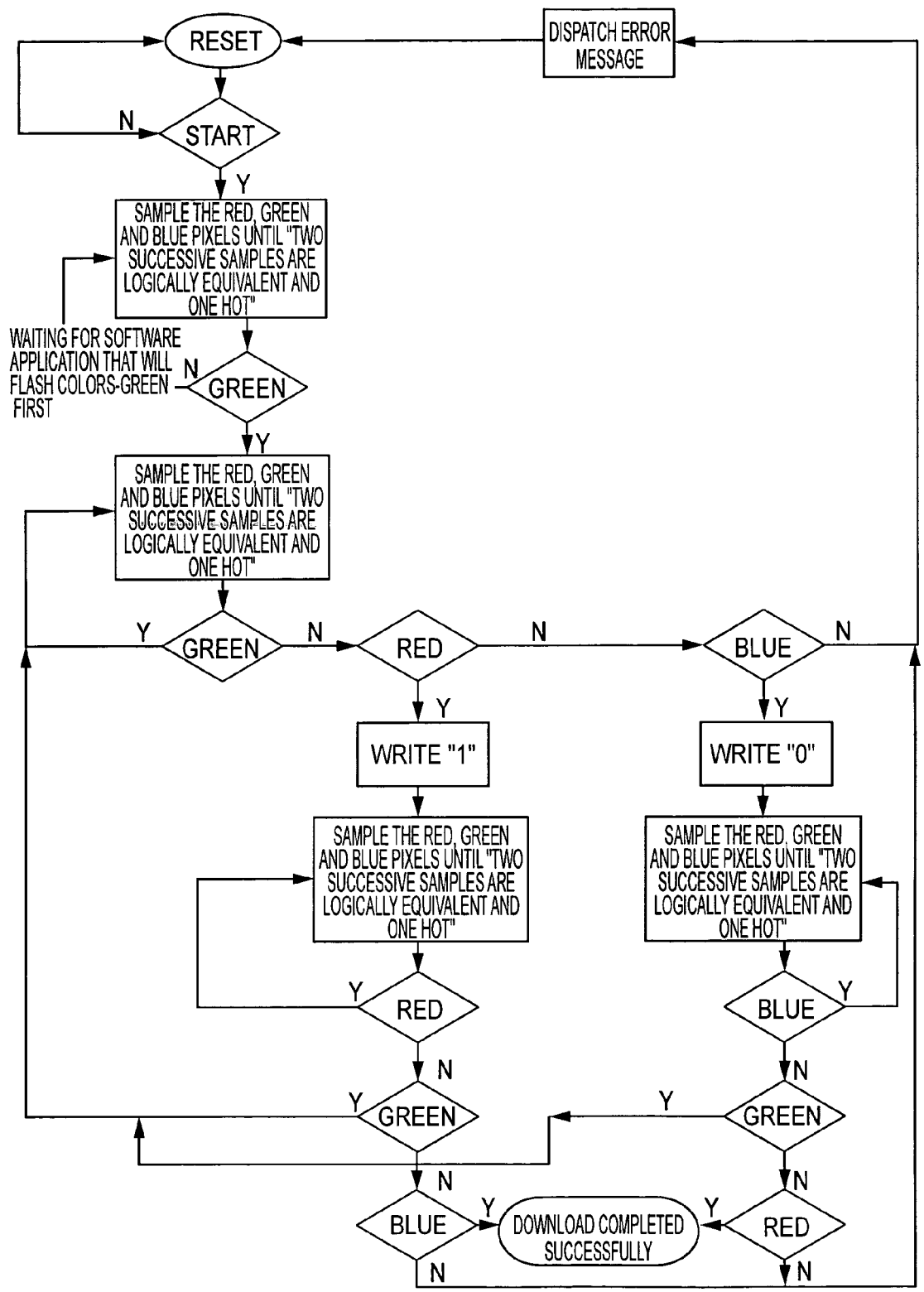
FIG. 6 shows an algorithm for translating data-input as colors into a digital stream in accordance with the invention.

Now referring to FIG. 6, the algorithm shows that when the three pixels 204, 206, 208 are sampled, a determination of their logical value (basically an "on" or "off" determination) can be made. If the intensity of any of the three pixels 204, 206, 208 is equal to or greater than the designated high threshold, then that pixel has a logical value of 1. If the intensity of any of the pixels 204, 206, 208 is equal to or less than a designated low threshold, then that pixel has a logical value of 0. Also, for every sample of the three pixels 204, 206, 208 it should be expected that only one pixel would be at a logical value of 1, for this embodiment, since only one color (G, R, or B) will be displayed at a time (other embodiments can be envisioned where multiple colors can be simultaneously displayed to achieve variations in color values). The possibility of sampling at the time when the color displayed is transitioning can be resolved by the provision in the algorithm that provides two successive samples with identical logical values for the three pixels 204, 206, 208 before proceeding to the next step in the algorithm. If such successive value in not identical the pixels 204, 206, 208 are sampled again. Note that the rate of pixel 200 sampling can be much higher (>×10) than the rate at which the display frame changes.

Figure 7:
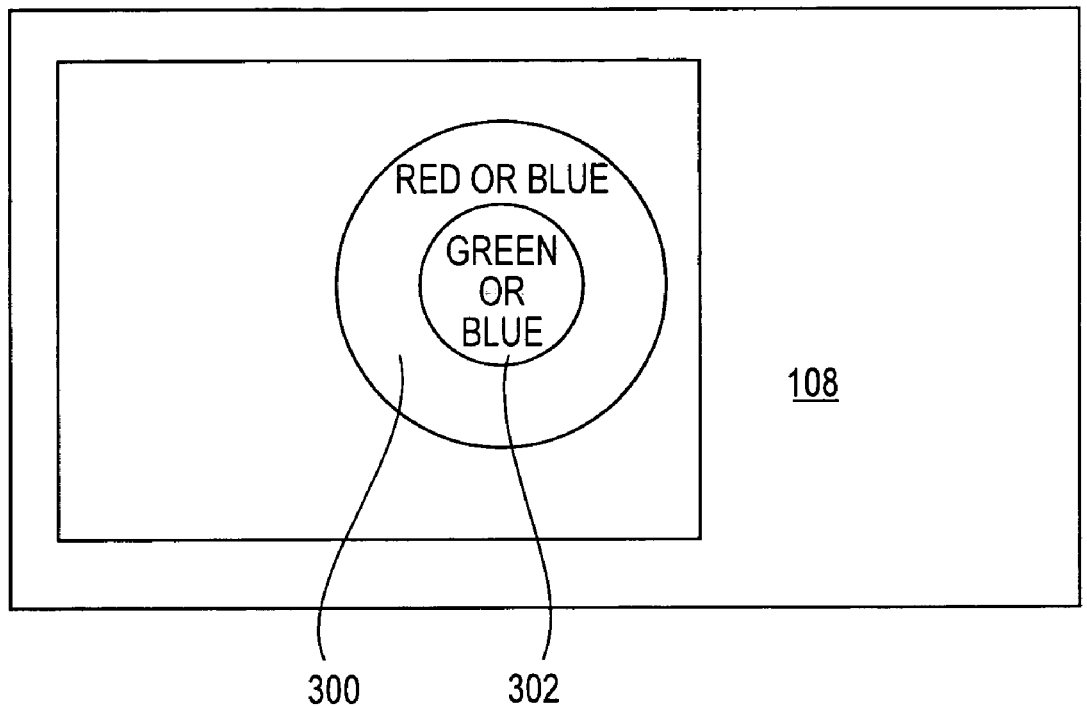
FIG. 7–FIG. 10 illustrate additional embodiments for downloading data as data-input in accordance with the invention.

In another embodiment program and/or data can be downloaded in the form of color rings or superimposed circles. Software running on a program control system 30 can display an image like that shown in FIG. 7 with the photo-data generator (e.g., computer screen 108). In such an approach, there can be a color ring corresponding to data— the data ring 300, and a color ring corresponding to clock— the clock ring 302. The photosensor 14 can be placed facing the computer screen 108 with its center aligned to the center of the display. As an example, the data ring 300 can be either

TABLE 1 streaming digital content serially with primary color transitions

| Bit | Start | 0 | 0 | 0 | 1 | 1 | 0 | 1 | 1 | End |
|---|---|---|---|---|---|---|---|---|---|---|
| Color | G | B | G | B | G | B | G | R | G | R | G | B | G | R | G | R | RB | red (implying a digital "1") or blue (implying a digital "0"). The clock ring 302 can be either green or blue. Upon the transition of the clock ring 302 (from green to blue or from blue to green) the photosensor 14 can sample the red and blue pixels (see 208 and 206 of FIG. 5). Note that more data bits can be downloaded in parallel with multiple data circles.

Figure 8:
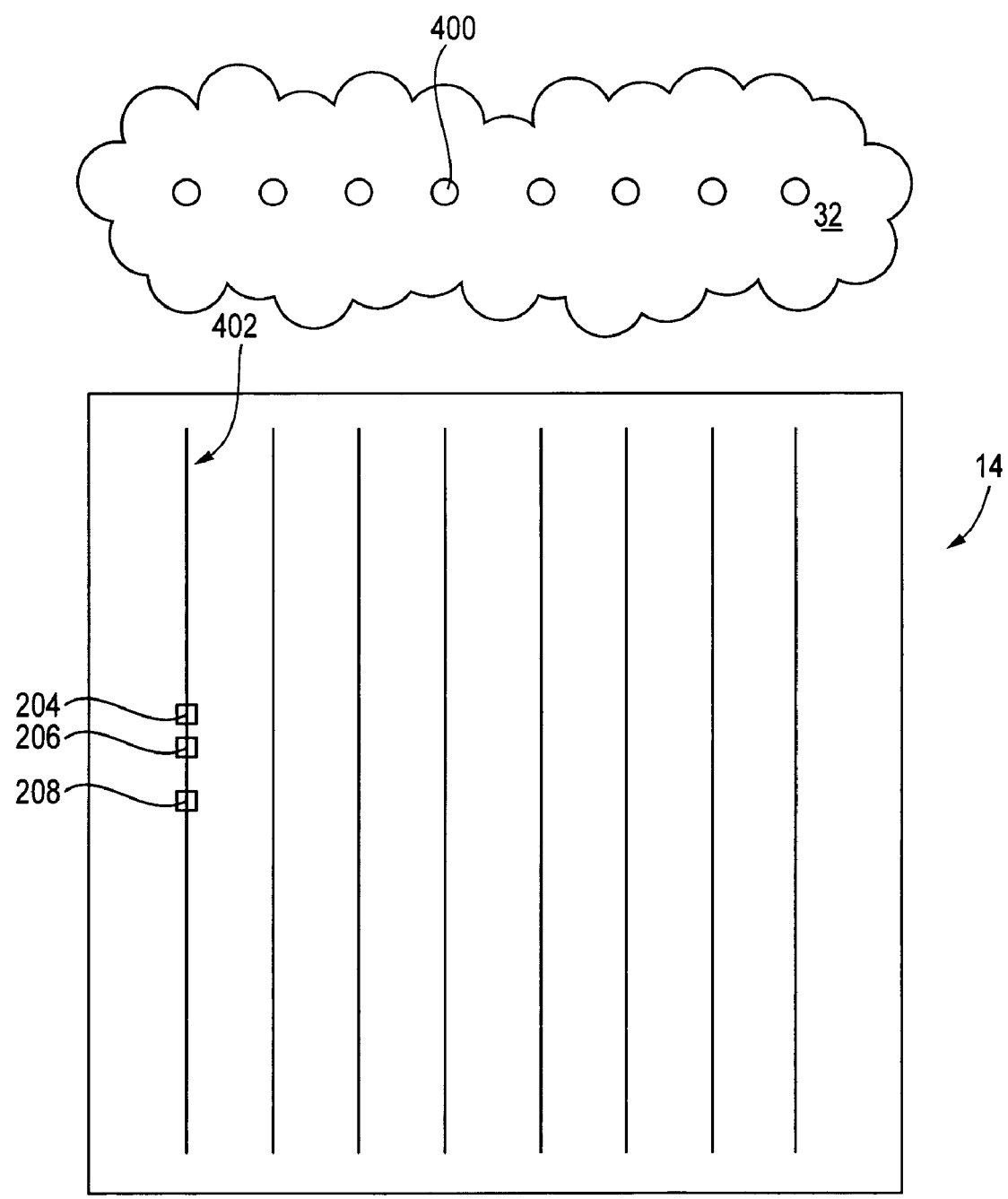

In another embodiment, the photosensor array 14 can be divided into segments 402, as shown in FIG. 8. This embodiment allows as many sources 400 of light (for data-input 34) as there are segments 402 in the photosensor array 14. Each segment 402 can operate to download a stream of data-input 34. As an example, the light sources can be individual LEDs, spaced to deliver light 36 to respective segments of the photosensor array 14. If such individual LEDs are used, partitions can be utilized between each LED so that the data-input 34 signals do not intermingle.

Use of the segmented photosensor array 14 can allow 8 bits to be conveyed in parallel to each individual segment 402. As an example, each segment can be a row of pixels 200 and these rows can be spaced about 25 pixels apart so that at least eight rows of pixels can be utilized as segments 402. Like the embodiment discussed in relation to FIG. 5, each segment 402 can utilize centralized pixels 204, 206, 208 to download the respective data-input 34. The parallel download capability enabled by this embodiment can allow information to be downloaded at a far greater rate than a pure serial download. This embodiment requires some alignment of the device 10 and the photosensor array 14 with the photo data generator 32 so that the data-input 34 corresponds in proximity with the segments 402 of the photosensor array 14. This alignment can be accomplished in a variety of ways that will be readily apparent to those of skill in the art. A preferred way of obtaining the desired alignment is through the use of a cradle device that can hold the device 10 in an position aligning the segments 402 with the light sources 400.

Figure 9:
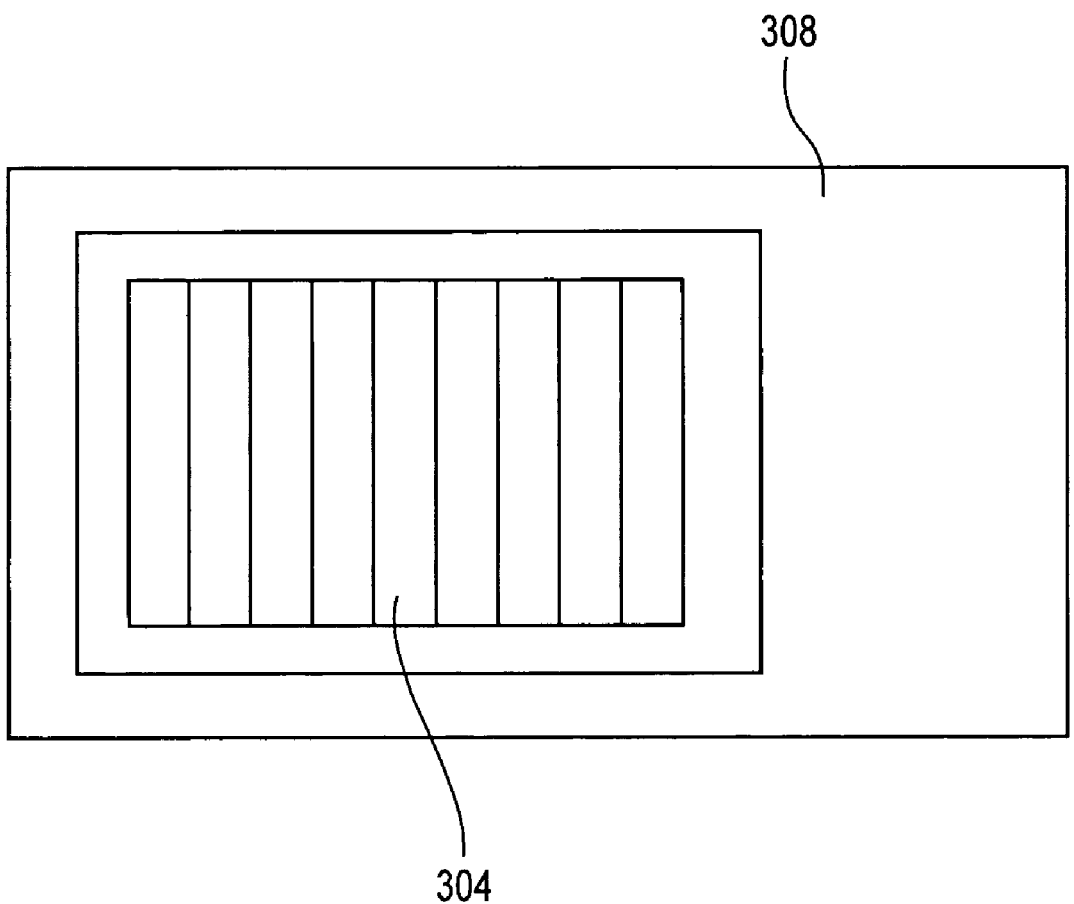

In another embodiment illustrated in FIG. 9, data can be downloaded to the segmented photosensor array 14 as color changes. In this embodiment, vertical columns 304 of changing colors can be input to each of the segments 402 to convey parallel streams of programming and/or data information to the respective segments 402. This embodiment effectively combines the download methods described above in reference to FIG. 5 and FIG. 8. For example, an LED light emitter can be used to convey a byte (8-bits) of information at time to the photosensor array 14, in parallel. In such an embodiment, a ninth LED emitter can be used to control the reading of the other eight emitters. The LED partitions noted above can be used in this embodiment as well. In addition to LEDs, the light source can also be arrays of color areas on a computer screen 108. This embodiment, like the embodiment discussed above in reference to FIG. 8, can benefit from the use of a cradle device 308 for properly aligning the device with the vertical columns 304.

Figure 10:
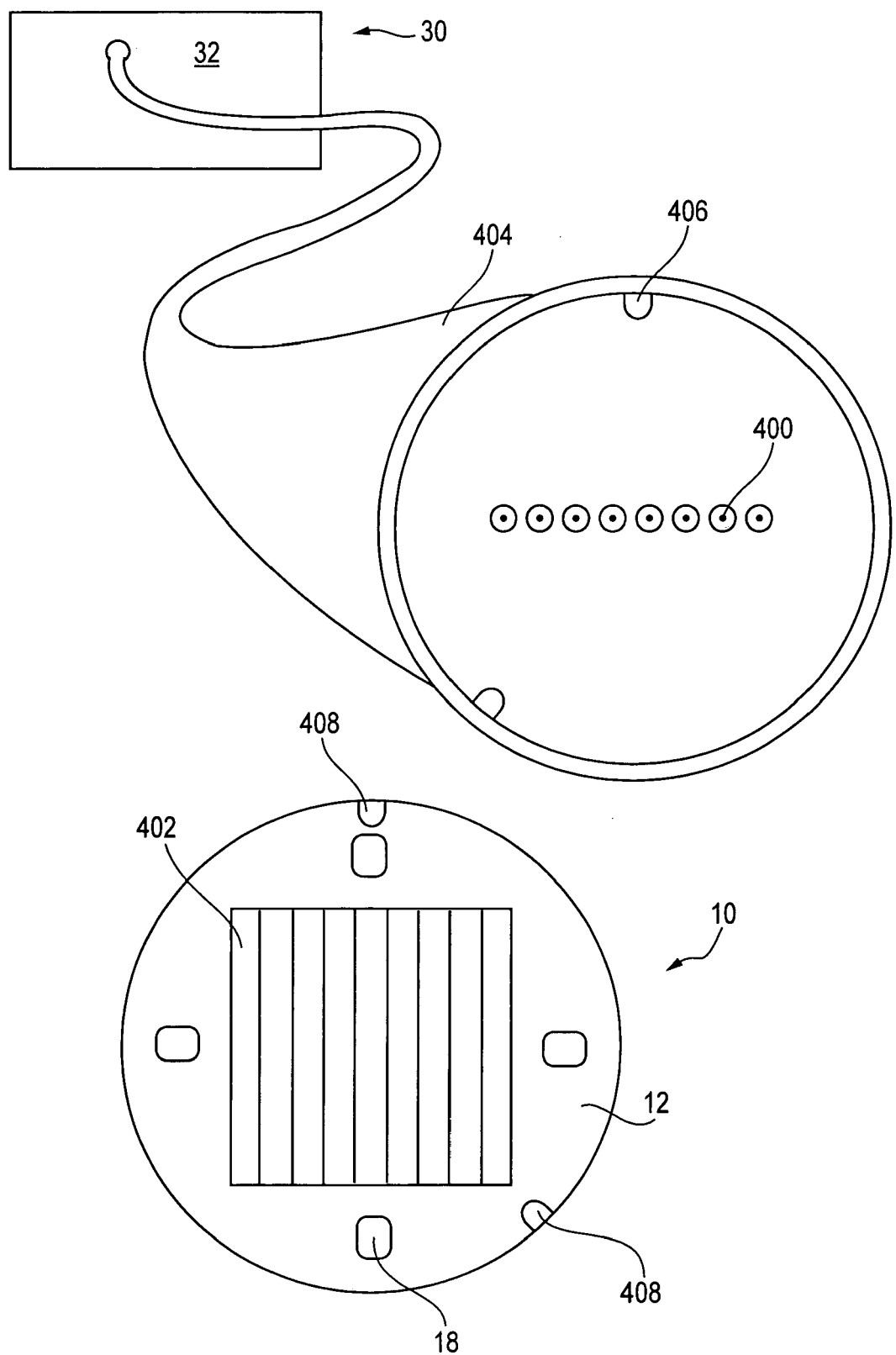

As noted above, in various embodiments of the invention the device 10 should be somewhat aligned with the photo-data generator 32 during the download. One such means for aligning the device 10 as necessary is illustrated in FIG. 10. FIG. 10 shows the photo-data generator 32, which can be incorporated into the program command system (e.g., a computer). As is shown, a fiber optic cable 404 can be attached to the photo-data generator 32 so that the data-input 34 can be controlled in location and direction and simultaneously partitioned so that light intended for respective segments 402 of the photosensor array 14 does not intermingle. The fiber optic cable 404 can incorporate channeled optics so that the light 36 emitted by the photo-data generator 32 is initially transmitted in discrete channels and remains in those channels until acquired by the designated segments 402 of the photosensor array 14. So that the device 10 and the segments 402 of the photosensor array 14 properly align when the device 10 is placed adjacent the fiber optic cable 404 the fiber optic cable can have alignment tabs 406 designed to fit into respective alignment slots 408 in the device 10. When the alignment tabs 406 and slots 408 are fitted, a user can be sure of proper alignment of the data-input 34 and the segments 402 of the photosensor array 14.

In another embodiment of the invention nibble info can be utilized as the data-input 34. A byte of programming and/or data information can split into two four-bit halves, each half called a nibble. A nibble can be recognized by the photosensor array 14 as a light impulse at a fraction of its maximum intensity. The pixels 200 of the photosensor array 14 can sense the intensity levels of the data-input 34 light 36. Varying intensity levels can convey different information just as can different colors can as described above. Nibbles are useful in packing information together. Using nibbles, the imager system can utilize a greater variety of input having greater versatility.

The above description, examples, and accompanying drawings are only illustrative of exemplary embodiments, which can achieve the features and advantages of the present invention. It is not intended that the invention be limited to the embodiments shown and described in detail herein. The invention can be modified to incorporate any number of variations, alterations, substitutions or equivalent arrangements not heretofore described, but which are commensurate with the spirit and scope of the invention. Accordingly, the invention is not to be considered as being limited by the foregoing description, but is only limited by the scope of the appended claims.

What is claimed as new and deserving to be protected by U.S. Letters Patent is as follows:

1. An image sensor apparatus, comprising:
   a CMOS photosensor array for sensing image information and data information;
   a memory circuit in electrical communication with said CMOS photosensor array; and
   a photo-data generator configured to output said data information as light emissions;
   said CMOS photosensor array being configured to receive said light emissions and said memory circuit being configured to receive and store said data information; and
   wherein said light emissions are a plurality of colored rings.

2. An image sensor apparatus, comprising:
   a photosensor array for sensing image information and data information;
   a memory circuit in electrical communication with said photosensor array; and
   a photo-data generator configured to output said data information as light emissions;
   said photosensor array being configured to receive said light emissions and said memory circuit being configured to receive and store said data information; and
   wherein said light emissions are a plurality of colored rings.

3. An image sensor apparatus, comprising:
   a CMOS photosensor array for acquiring an image and receiving data information;
   a memory circuit in electrical communication with said CMOS photosensor array;
   a strobe device configured to operate with said CMOS photosensor array in acquiring an image; and
   a photo-data generator configured to output said data information as light emissions;

said CMOS photosensor array being configured to receive said light emissions and said memory circuit being configured to receive and store said data information; and wherein said photo-data generator is a computer monitor.

4. The apparatus of claim 3, wherein only a portion of the computer monitor generates said light emissions.

5. An image sensor apparatus, comprising:
a photosensor array configured to capture images and download data information;
a memory circuit in electrical communication with said photosensor array; and
a photo-data generator configured to output said data information as light emissions;
an image transmitting device comprising a wireless transmitter;
said photosensor array being configured to receive said light emissions and said memory circuit being configured to receive and store said data information;
wherein said photo-data generator is a computer monitor.

6. The apparatus of claim 5, wherein only a portion of the computer monitor generates said light emissions.

7. An image sensor device, comprising:
a photosensor array configured to receive data information as light signals;
a memory circuit configured to store said data information received by said photosensor array as light signals;
wherein a controller is in operative communication with said photosensor array, an LED strobe, and said memory circuit, and wherein said controller is configured to utilize said data information to operate the image sensor device in acquiring images.

8. The image sensor device of claim 7, wherein said controller is configured to receive said data information from said photosensor array and communicate said data information to said memory circuit.

9. The image sensor device of claim 7, wherein said data information is selected from the group consisting of microcode, hardware interrupt control instructions, software, revised program software, and operating parameters.

10. The image sensor device of claim 7, wherein said data information comprises programming.

11. The image sensor device of claim 7, wherein said light signals are emitted from a photo-data generator.

12. The image sensor device of claim 11, wherein said photo-data generator is part of a device separate from said image sensor device.

13. An image sensor apparatus, comprising:
a CMOS photosensor array for acquiring an image and receiving data information;
a memory circuit in electrical communication with said CMOS photosensor array;
an image data output device configured to wirelessly output data; and
a photo-data generator configured to output said data information as light emissions,
said CMOS photosensor array being configured to receive said light emissions and said memory circuit being configured to receive and store said data information.

14. The apparatus of claim 13, wherein said light emissions are a plurality of colors, each of said plurality of colors representing data information to be received and stored in said memory circuit.

15. The apparatus of claim 13, wherein said light emissions are patterned, said patterned light emissions representing data information to be received and stored in said memory circuit.

16. The apparatus of claim 13, wherein said CMOS photosensor array and said memory circuit are integrated on a single chip.

17. The apparatus of claim 13, wherein said data information received by said CMOS photosensor from said photo-data generator comprises software.

18. The apparatus of claim 13, further comprising a program command system in communication with said photo-data generator, said program command system providing said data information transmitted to said CMOS photosensor array as said light emissions.

19. The apparatus of claim 13, further comprising a fiber optic cable structured to transmit said light emissions to said CMOS photosensor array.

20. The apparatus of claim 13, wherein said CMOS photosensor array is divided into a plurality of segments, each of said segments being structured to receive respectively segmented light emissions.

21. The apparatus of claim 13, wherein said photo-data generator is at least one LED.

22. The apparatus of claim 13, wherein said CMOS photosensor array and said memory circuit are on a chip within a camera device.

23. The apparatus of claim 22, wherein said camera device is within an ingestible capsule.

24. An image sensor apparatus, comprising:
a photosensor array configured to capture images and download data information;
a memory circuit in electrical communication with said photosensor array;
an image data output device configured to wirelessly output data; and
a photo-data generator configured to output said data information as light emissions,
said photosensor array being configured to receive said light emissions and said memory circuit being configured to receive and store said data information.

25. The apparatus of claim 24, wherein said light emissions are a plurality of colors, each of said plurality of colors representing data information to be received and stored in said memory circuit.

26. The apparatus of claim 24, wherein said light emissions are patterned, said patterned light emissions representing data information to be received and stored in said memory circuit.

27. The apparatus of claim 24, wherein said photosensor array and said memory circuit are integrated on a single chip.

28. The apparatus of claim 24, wherein said data information received by said photosensor from said photo-data generator comprises software.

29. The apparatus of claim 24, further comprising a program command system in communication with said photo-data generator, said program command system providing said data information transmitted to said photosensor array as said light emissions.

30. The apparatus of claim 24, further comprising a fiber optic cable structured to transmit said light emissions to said photosensor array.

31. The apparatus of claim 24, wherein said photosensor array is divided into a plurality of segments, each of said segments being structured to receive respectively segmented light emissions.

32. The apparatus of claim 24, wherein said photo-data generator is a plurality of LEDs.

33. The apparatus of claim 24, wherein said photosensor array and said memory circuit are on a chip within a camera device.

34. The apparatus of claim 33, wherein said camera device is within an ingestible capsule.

* * * * *